UNITED STATES PATENT OFFICE.

ROGER ADAMS, OF URBANA, AND ERNEST H. VOLWILER, OF CHICAGO, ILLINOIS, ASSIGNORS TO THE ABBOTT LABORATORIES, OF CHICAGO, ILLINOIS, A CORPORATION OF ILLINOIS.

ALLYL ESTERS OF P-AMINO BENZOIC ACID.

1,360,994.   Specification of Letters Patent.   Patented Dec. 7, 1920.

No Drawing.   Application filed May 10, 1920.   Serial No. 380,045.

*To all whom it may concern:*

Be it known that we, ROGER ADAMS and ERNEST H. VOLWILER, residing, respectively, at Urbana, in the county of Champaign and State of Illinois, and at Chicago, in the county of Cook and State of Illinois, both citizens of the United States of America, have invented certain new and useful Improvements in Allyl Esters of P-Amino Benzoic Acid, of which the following is a specification.

Our invention relates to improvements in esters of aromatic acids and has particular reference to allyl esters of aromatic acids containing a benzene nucleus.

The principal object of the invention is to provide a compound of the class described which shall have valuable anesthetic properties.

*The general method of synthesizing compounds of this series.*

The nitro derivatives of allyl esters of aromatic acids containing a benzene nucleus are treated with iron powder and hydrochloric acid, keeping the temperatures of the mixture at 50° and continuing the reaction until all of the nitro compound is dissolved. When a clear liquid results, the reaction mixture is carefully made neutral or if no hydroxyl group is present, alkaline, and the free amino compound extracted with ether. Upon evaporation of the ether solution, the amino compounds desired are obtained. In order to produce a substituted amino derivative, the primary amino compound is treated with an alkyl halid under the usual conditions.

*Specific compounds in this series.*

A specific compound belonging to the general series as above defined, is the allyl ester of para-amino benzoic acid. This is made by the reduction of the allyl ester of para-nitrobenzoic acid. Since this latter compound has not yet been described, a brief mention of its method of preparation is given here: A mixture of one gram-molecule of para-nitro benzoyl chlorid and one gram-molecule of allyl alcohol, upon refluxing together for from one to two hours, yields upon vacuum distillation practically a quantitative yield of the allyl ester of para-nitrobenzoic acid, straw-colored oil boiling at 178° at 19 mm. pressure.

Twenty-five grams of the allyl ester just mentioned is mixed with 100 grams of powdered iron and 30 per cent. hydrochloric acid is gradually added, the mixture being kept at about 50° during the reduction. Stirring is carried on constantly and the reaction continued until no more ester remains. The reaction mixture is then filtered from the excess iron, made alkaline with sodium hydroxid and extracted with ether. The ether solution upon evaporation yields the allyl ester of para-amino-benzoic acid, which may be crystallized from water or petroleum ether. It is a white compound with a melting point, when pure, of 51°–52°.

This material is an anesthetic compound which may be used locally, internally, for dusting on wounds, and for anesthetic purposes in general, and its formula is as follows:

$$(p) NH_2C_6H_4COOCH_2CH=CH_2$$

Another specific compound of this series is the allyl ester of 1, 3, 5-diaminobenzoic acid which is prepared as follows:

An excess of allyl alcohol is added to the acid chlorid of 1, 3, 5 dinitrobenzoic acid and the mixture refluxed for an hour. Any excess of allyl alcohol used is removed by distillation *in vacuo*, and the allyl ester of the 1, 3, 5 dinitrobenzoic acid solidifies upon cooling.

This is reduced to the allyl ester of 1, 3, 5 diaminobenzoic acid with iron and hydrochloric acid, as described under the first example. The product thus obtained is a viscous liquid which does not solidify at room temperature. It forms a dihydrochlorid when dissolved in ether and treated with an excess of alcoholic hydrochloric acid. This dihydrochlorid of the allyl ester of 1, 3, 5 diaminobenzoic acid forms a yellowish solid melting at 224° with decomposition.

The scope of the invention is defined by the appended claims.

We claim as our invention:

1. As a new article of manufacture, a compound of the formula—

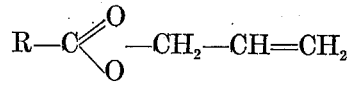

where R is an amino derivative of an aromatic acid containing a benzene nucleus.

2. As a new article of manufacture, the allyl ester of an amino benzoic acid.

3. As a new article of manufacture, the allyl ester of p-amino benzoic acid having the formula—

and being a white solid melting at 51°–52°.

ROGER ADAMS.
ERNEST H. VOLWILER.